S. T. HARKER.
Steam Heater.
No. 65,667.
Patented June 11, 1867.
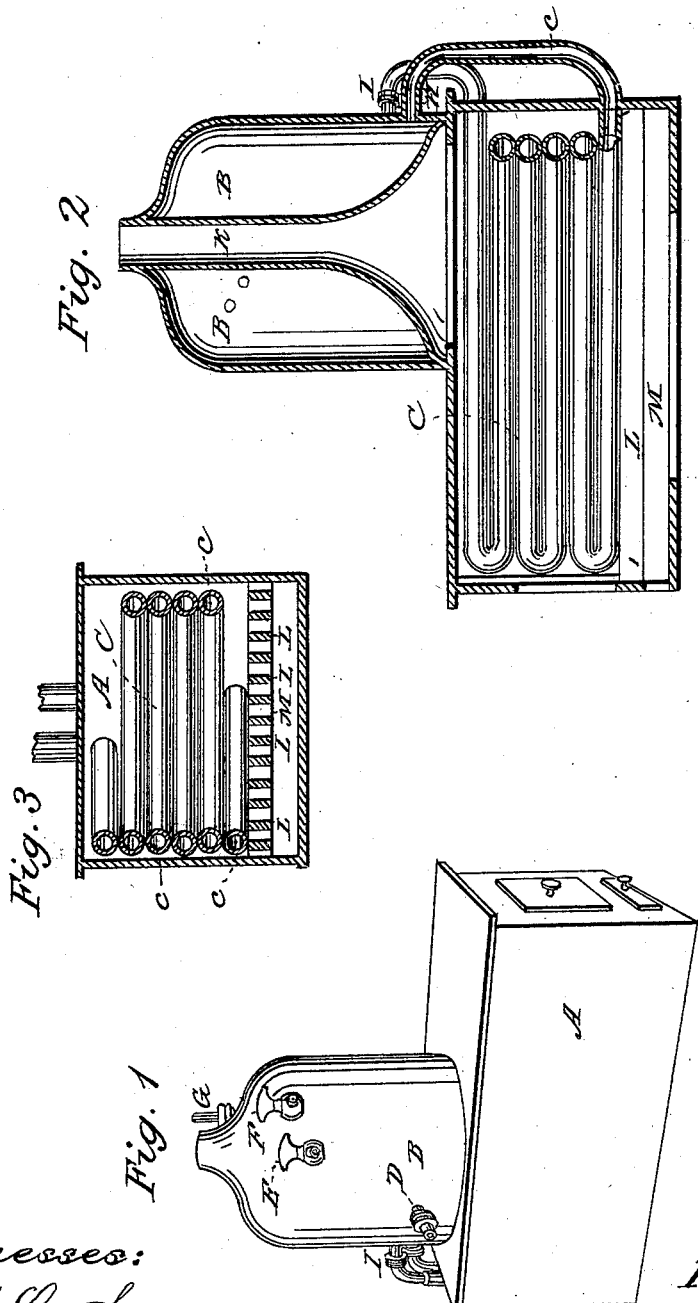

United States Patent Office.

S. T. HARKER, OF MILWAUKEE, WISCONSIN.

Letters Patent No. 65,667, dated June 11, 1867.

STEAM-HEATING APPARATUS.

*The Schedule referred to in these Letters Patent and making part of the same.*

TO ALL WHOM IT MAY CONCERN:

Be it known that I, S. T. HARKER, of the city and county of Milwaukee, and State of Wisconsin, have invented a new and useful improvement in Steam-Heating Apparatus; and I do hereby declare that the following is a full, clear, and exact description thereof, which will enable those skilled in the art to make and use the same, reference being had to the accompanying drawing, forming part of this specification, in which—

Figure 1 is a perspective view.

Figure 2, a longitudinal sectional view.

Figure 3, a cross-section.

Similar letters of reference in each of the figures indicate corresponding parts.

The object of my invention is to generate steam and superheat the same in an expeditious and economical manner.

A is the brick-work of the fire-box or furnace; B, water and steam-dome; C, heating-water back or coil; D, feed-water pipe; E and F, gauge-cocks; G, steam pipe to convey steam to coils or other radiating heaters; H and I, connections or couplings, connecting water-back to dome; K, smoke-passage; L, fire-grates; M, ash-pit.

Operation.

Water is first pumped into dome B, through pipe D, till the water-back or coil and dome B are filled up to gauge-cock E. The part of dome B above the gauge-cocks is for steam-chamber. Fire is then built on the grates, and as the heat is communicated to the water, it circulates constantly through the water-back or coil, which, being on three sides of the fire-box, presents a large fire-surface, and the smoke and heat rising and passing through passage K, communicate heat to the water in dome B, which generates steam rapidly, and superheats the same in the steam-chamber, which, being carried off through pipe G, warms buildings as desired.

What I claim as my invention, and desire to secure by Letters Patent, is—

A steam-heating apparatus consisting of fire-chamber A, with coil C on three sides, water and steam dome B on the fire-chamber, with a smoke-passage through it, large at the bottom and contracted at the top, and both ends of the coil C entering the dome below the water-line, all arranged and combined substantially as described.

S. T. HARKER.

Witnesses:
   CHAS. A. SMITH,
   J. B. SMITH.